UNITED STATES PATENT OFFICE.

FREDERIC H. HALL, OF HACKENSACK, NEW JERSEY.

IMPROVEMENT IN THE PROCESSES OF MANUFACTURING ARTIFICIAL MARBLE, AND VEINING THE SAME.

Specification forming part of Letters Patent No. 145,345, dated December 9, 1873; application filed November 26, 1873.

*To all whom it may concern:*

Be it known that I, FREDERIC H. HALL, of Hackensack, in the county of Bergen and State of New Jersey, have invented an Improved Process of Manufacturing Artificial Marble, and of Veining the same, of which the following is a specification:

In all the marble heretofore manufactured the veining has been merely on the surface, as by the processes used no other or deeper veining could be obtained with any degree of certainty; neither has the veining been true to nature, not having the clearly-defined edges always to be seen in natural marble. Each color in the natural marble is distinctly defined.

By my process it can be made of any desired thickness or shape, and will be as perfect marble in the center of the block as on the surface, and the veining will be true to nature throughout.

My method is as follows: I take a level surface of any kind, or a mold, if a particular shape is desired, and flow it with the color or colors, dissolved in either alcohol, water, or other liquids, very thin, that they will not mix with the cement, but will flow through it, leaving a vein between each formation. I then take white cement, (Keen's, Roman's, or any other which can be used to equal advantage,) or, if I wish to produce imitation of colored marbles, cement colored with any tints desired, and reduce it to about the consistency of paste. It is then, by the hand or any suitable instrument, thrown over this surface or mold so prepared, or such part of the same as may be necessary to imitate the marble you wish to make. The liquid coloring, being lighter than the cement thrown upon it, is forced up between the patches of cement and incloses each of them, and forms a compact vein around it, more or less heavy, according to the amount of colored fluid used, and the nearness of the patches of cement, and the force with which they are pressed together. This process is continued till the desired thickness is obtained, adding more of the colored fluid from time to time, as required. After standing a sufficient length of time to harden, the blocks can be cut into slabs of any desired shape or thickness, or carved into any form, as required. Where it is not necessary that the marble should be of the full thickness, a back of cement or other substance can be added to the marble thus made.

I do not claim the use of cements, coloring, molds, or flat surfaces, as they have been heretofore used.

I claim as my invention—

In the manufacture of marble, the process of veining the same by flowing or floating the colors preparatory to incorporation with cement-paste tinted or in its natural state, substantially as described.

FREDERIC H. HALL.

Witnesses:
 THOS. J. MYERS,
 J. F. RILEY.